United States Patent [19]

Maki et al.

[11] 4,426,465

[45] Jan. 17, 1984

[54] COATING COMPOSITIONS FOR SOLAR SELECTIVE ABSORPTION COMPRISING A THERMOSETTING ACRYLIC RESIN AND PARTICLES OF A LOW MOLECULAR WEIGHT FLUOROCARBON POLYMER

[75] Inventors: Masao Maki, Nabari; Hiroshi Fukuda, Koriyama; Seiichi Sano, Nara, all of Japan

[73] Assignee: Matsushita Electric Industrial Company, Limited, Osaka, Japan

[21] Appl. No.: 350,040

[22] Filed: Feb. 18, 1982

[30] Foreign Application Priority Data

Feb. 19, 1981 [JP] Japan .................... 56-24094

[51] Int. Cl.$^3$ .................... C09D 3/81; C09D 5/32; B05D 5/00; B32B 15/08
[52] U.S. Cl. .................... 523/135; 428/327; 428/328; 428/336; 524/407; 524/413; 524/437
[58] Field of Search ............... 523/135; 524/407, 413, 524/431

[56] References Cited

U.S. PATENT DOCUMENTS 3,876,552  4/1975  Moynihan ..................... 523/135
4,011,190  3/1977  Telkes ........................... 523/135
4,228,267  10/1980 Higashizume et al. ......... 523/135
4,310,596  1/1982  Buskirk ......................... 524/407

OTHER PUBLICATIONS

"High Absorptivity Solar Absorbing Coatings" by D. M. Mattox and R. R. Sowell, *J. Vac. Sci. Technol.*, vol. 11, No. 4, pp. 793-796 (1974).
"Solar Absorptance and Emittance Properties of Several Solar Coatings", by R. B. Pettit and R. R. Sowell, *J. Vac. Sci. Technol.*, vol. 13, No. 2, pp. 596-601 (1976).

*Primary Examiner*—Melvyn I. Marquis
*Assistant Examiner*—Herbert J. Lilling
*Attorney, Agent, or Firm*—Lowe, King, Price & Becker

[57] ABSTRACT

A coating composition for solar selective absorption comprising, in solvent, particles of an inorganic black pigment dispersed in a dissolved binder of a thermosetting acrylic resin and particles of a low molecular weight fluorocarbon resin contained in an amount of 5-15 parts by weight per 100 parts by weight of the acrylic resin. The inorganic black particles have a size of 0.01-0.5 microns and are contained in an amount of 45-65 parts by weight per 100 parts by weight of the acrylic resin. An article having a metal substrate and a paint film formed thereon from the composition in a dry thickness of 1.5 microns or more is also described.

8 Claims, 6 Drawing Figures

HEAT STABILITY

HOT AIR DRYER AT 150°C

ACCELERATED WEATHERABILITY

SUNSHINE-TYPE WEATHER METER (JIS Z 0230)

CORROSION RESISTANCE

SALT WATER SPRAY (JIS Z 0371)

COATING COMPOSITIONS FOR SOLAR SELECTIVE ABSORPTION COMPRISING A THERMOSETTING ACRYLIC RESIN AND PARTICLES OF A LOW MOLECULAR WEIGHT FLUOROCARBON POLYMER

BACKGROUND OF THE INVENTION

1. Field of the Invention

This invention relates to utilization of solar energy and more particularly, to coating compositions for selective solar absorption which can provide effective selective solar absorbing coatings for solar collectors and also to articles obtained from these coating compositions.

2. Description of the Prior Art

A variety of black absorber layers such as obtained from ordinary black paints which have been utilized in the field of domestic hot water supply have been found to efficiently absorb incident solar radiation but to readily emit once absorbed thermal energy.

As is well known in the art, solar collector surfaces or layers should preferably have such characteristics as not only to absorb solar energy in the ultraviolet, visibile and near-infrared regions as much as possible, but also to minimize the energy emitting from the surface whose temperature has been increased by the absorption of the solar energy.

Owing to the substantial absence of materials having these solar selective absorption properties, attempts have been made to achieve a high degree of solar selectivity by the use of various combination systems.

Typical of prior-art techniques is formation of absorbers on many metal substrates which are a good reflector in the infrared region. The absorber should well absorb solar radiation at the short wavelengths of, say, 0.3–2.0 micrometers without impairing the reflectivity of metal substrate. For this purpose, there are used black copper, black chrome, black nickel and the like. In practice, the technique has mainly been applied to systems of higher temperatures than 92° C. at which the solar absorptance of the black body will equilibrate with the thermal emittance loss. In this system, the ratio of the solar absorptance, $\alpha$, to the thermal emittance, $\epsilon$, is one of important factors. Lower thermal emittances result in lower solar absorptances and vice versa. In order to meet the requirement that the ratio, $\alpha/\epsilon$, should be higher, it is the general practice that the selective absorption films of black copper, black chrome and the like are controlled at levels of a solar absorptance of 0.90 and a thermal emittance of 0.15.

For domestic hot water supplies, the absolute value of $\alpha$ is more important as the solar selective absorptivity characteristic than the ratio, $\alpha/\epsilon$, since the surface temperature of domestic collector systems is at most as low as 75° C. and thus the radiant energy level from the surface becomes low. In this connection, however, in flat plate collector systems for hot water service, the thermal radiative loss from the collector surface may reach even 20–30% of the total loss of the system, so that it will be effective in improving the collector efficiency to suppress the thermal emittance from the collector surface to a low level.

The first demand for apparatuses utilizing solar energy is economy because they are used for energy saving. The selective absorption films of, for example, black chrome and the like mentioned hereinbefore involve a difficulty when applied for domestic hot water supply since their plating equipment is usually large in scale and thus the processing cost is increased.

Some attempts have been made to produce selective absorption paint films or coatings which have advantages such as ease of application, low production cost and availability of large coating areas, among which there are well known studies of paints which comprise semiconductor pigments such as Ge, Si, PbS or the like dispersed in silicone resins or the like. For instance, these studies have been reported in "High absorptivity solar absorbing coatings" by D. M. Mattox and R. R. Sowell, J. Cac, Sci. Technol., Vol. 11, No. 4, pp 793–796 (1974) and "Solar absorptance and emittance properties of several solar coatings" by R. B. Pettit and R. R. Sowell, J. Vac. Sci. Technol. Vol. 13, No. 2, pp 596–601 (1976).

In these paint coatings, however, the absorptance, $\alpha$, is over 0.9 but the thermal emittance, $\beta$, is in the range of 0.70–0.90 in all the samples, thus the selective absorptivity is poor. Pettit et al stated in the above-mentioned literature that the high emittance is due to the fact that when the film of the silicone binder itself exceeds 10 micrometers in thickness, the emittance increases. In order to overcome this disadvantage, there has been proposed an improved method in which the ratio of semiconductive particles to silicone resin increases so as to decrease the content of the silicone resin in paint film. However, this method is also disadvantageous in that (1) the viscosity of paint increases, (2) mechanical strengths of the paint film are lowered, and (3) adhesion between the paint and metal substrate is lowered.

As particularly shown in these researches, selective absorption films obtained by prior-art paint coating techniques invariably present the following technical problems: (a) if the thickness of paint film is reduced, the emittance is lowered but undesirably the solar absorptance is also lowered; (b) as for the film thickness, even though it would have experimentally been confirmed that a film thickness of 1 micrometer could give relatively satisfactory results with respect to selective absorptivity, coating techniques are not known for stably forming a uniform 1 micrometer thick film; and (c) such a thin film of about 1 micron, if obtained, would exhibit only poor and unreliable physical properties.

SUMMARY OF THE INVENTION

It is accordingly an object of the invention to provide coating compositions for selective solar absorption which can overcome the technical problems involved in the prior-art techniques.

It is another object of the invention to provide coating compositions for solar radiation which can yield films having well-balanced selective absorptivity and film properties.

It is a further object of the invention to provide coating compositions of the type mentioned above which ensure formation of films in a thickness as thin as 1.5–5 microns and yet show a good working property.

It is a still further object of the invention to provide coating compositions which can stand use, when applied as film, even under very severe environmental conditions occurring when applied for solar radiation-utilizing apparatuses.

It is another object of the invention to provide coating compositions for selective solar absorption by which an efficient selective solar absorption film can be obtained at much lower cost than or about ⅛–1/10 time as low in cost as selective absorption films such as a colored stainless steel and is thus suitable for application to domestic apparatuses utilizing solar radiation.

It is an additional object of the invention to provide articles obtained from these compositions.

The above objects can be achieved by a coating composition for selective solar absorption which comprises a dispersion of particles of an inorganic black pigment having a size of from 0.01 to 0.5 micrometers and selected from the group consisting of oxides and double oxides of Fe, Mn, Cu, Cr, Co and Ni, and mixtures thereof in a dissolved binder of a thermosetting acrylic resin and particles of a fluorocarbon resin contained in an amount of from 5 to 15 parts by weight per 100 parts by weight of the acrylic resin, the inorganic pigment particles being present in an amount of from 45 to 65 parts by weight per 100 parts by weight of the acrylic resin.

This coating composition can be used in a highly diluted condition since the constituents show good affinity for one another and excellent dispersability in solvent. Accordingly, a very thin film of a dry thickness of 2–5 microns is endowed with good physical properties such as good adhesion to metal substrates and high mechanical strength. In addition, the film obtained from the composition is met by the requirement of the invention that the solar absorptance, $\alpha$, is as high as 0.93–0.94 and the thermal emittance is on the order of 0.3–0.5. Thus, both the physical properties and the selective absorptivity of the paint film are excellent and well-balanced. The application of the coating composition in highly diluted state is very advantageous in that when the densities of the dry film and coating composition are each taken as 1 and the solid content in the paint is in the range of 10–17 wt%, the dilution is about 1 to about 6–10 and a paint film of 3 micrometers in dry thickness can be formed in a wet thickness of 18–30 microns. This allows easy wet coating by known techniques without involving any troubles in application.

BRIEF DESCRIPTION OF THE ACCOMPANYING DRAWINGS

Figure 3A:
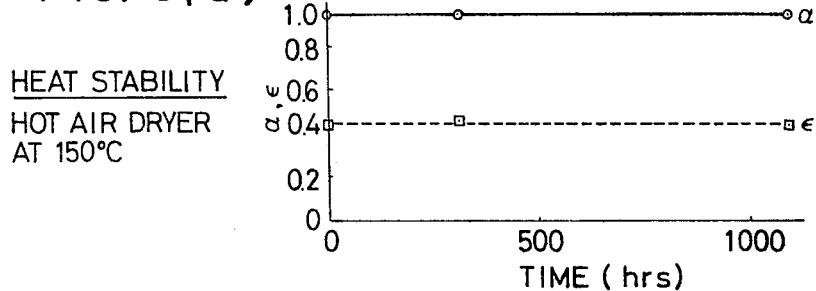
Figure 3B:
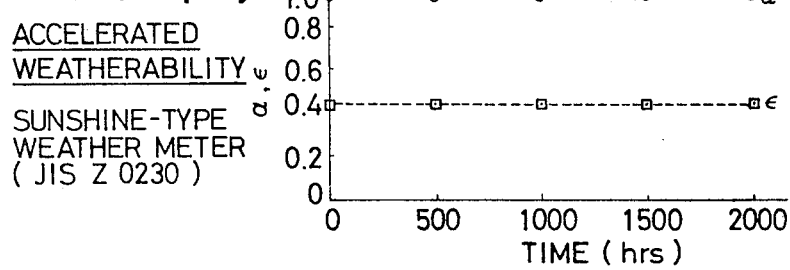
Figure 3C:
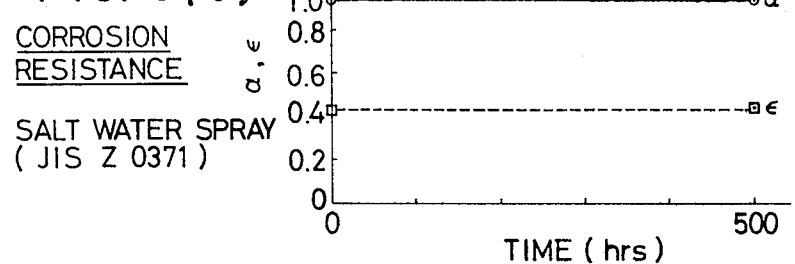
Figure 4:
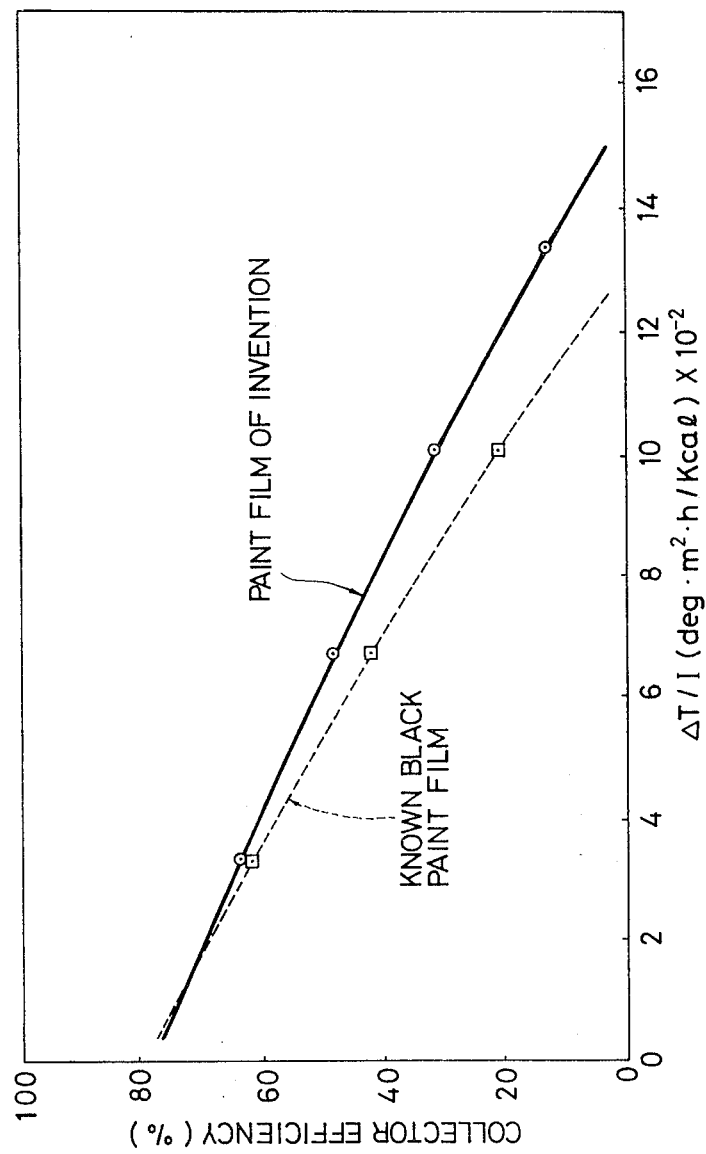

FIGS. 3(a) through 3(c) are, respectively, graphs of heat stability, weatherability and corrosion resistance of a film obtained according to the invention; and FIG. 4 is a graph of solar radiation collector efficiencies of flat plate collectors with an applied coating composition of the invention and a known black paint, respectively, for comparative purposes.

DETAILED DESCRIPTION AND PREFERRED EMBODIMENTS OF THE INVENTION

The constituents or ingredients of the coating composition for selective solar absorption according to the invention are the inoganic pigment and the mixed binder. Choice of the pigment and binder depends on the selective absorptivity, ease in preparing paint or coating composition, and physical properties of film. Although it is necessary to totally balance these characteristics, the selective absorptivity is of the first importance. That is, it is most important to suppress absorption of thermal radiation in the infrared region at wavelengths over 2 microns. An ideal selective solar coating should completely absorb solar radiation in wavelengths below 2 microns but should be transparent with respect to radiation in wavelengths over 2 microns. A number of factors affecting the selective absorptivity of film must be considered and include the followings.

| | |
|---|---|
| (1) Substrate metal | (emittance) Infrared reflectivity |
| (2) Pigment | Size and size distribution, spectral characteristic (ultraviolet, visible, near-infrared, infrared absorptances), shape, refractive index, dielectric constant, etc. |
| (3) Binder | Spectral characteristic, refractive index, dielectric constant, etc. |
| (4) Pigment-binder | PVC (pigment volume concentration), dispersability of pigment, close effect diffractiveness), difference in refractive index, etc. |
| (5) Film | Thickness. |

These factors are taken into account in order to evaluate pigments and binders for use in the practice of the invention.

In known black paint coatings, silicone resins have often been used. This is because silicone resins show excellent heat stability.

Figure 1:
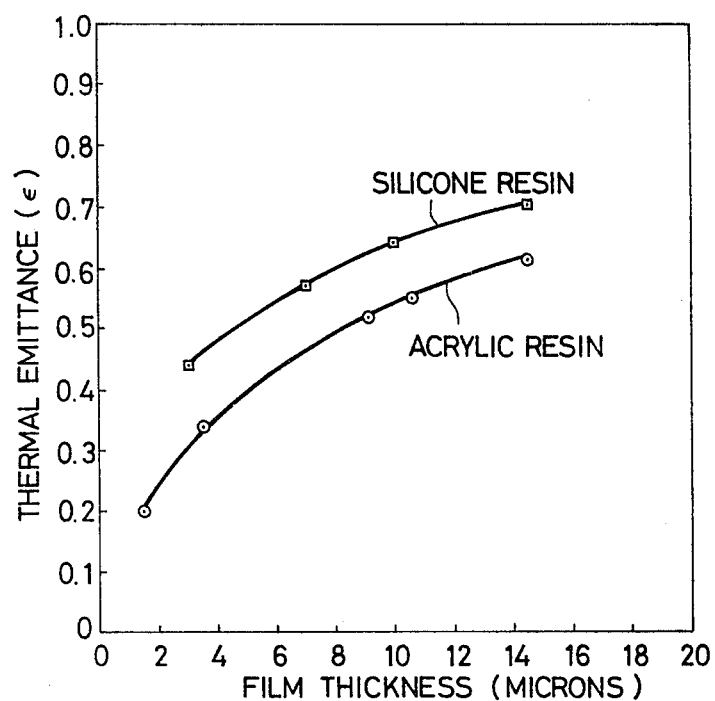
FIG. 1 is a graphical representation of a thermal emittance characteristic of two types of resins in relation to the variation in film thickness.

For domestic hot water supply service, it is considered sufficient to withstand temperatures of at most 150° C. and, in this sense, a wide variety of resins have been studied. That is, about 50 resins were used to evaluate the relationship between the film thickness and the thermal emittance ($\epsilon$) by forming a film of each resin free of any pigment on a stainless steel plate (18Cr-2M) by the use of a film applicator. As a result, it was found that a thermosetting acrylic resin showed good results. In FIG. 1, there is shown the comparison in thermal emittance between the typical silicone resin and the acrylic resin used in the present invention. From this, it will be seen that the acrylic resin is more satisfactory than the silicone resin. Taking even collectively into account other properties such as weatherability, adhesiveness to metal substrate, ease in coating application and the like, the acrylic resin has been found superior to the silicone resin.

The thermosetting acrylic resins useful in the practice of the invention are made of monomer units which have main chains such as of acrylic acid, methacrylic acid and esters thereof and functional side chains which take part in self-crosslinkage. Such side chains include the carboxyl group, hydroxyl group, amido group, methylol group, epoxy group, glycidyl group and the like. Examples of such monomers include acrylic esters such as methyl acrylate, ethyl acrylate, glycidyl acrylate, and the like, methacrylic esters such as methyl methacrylate, ethyl methacrylate,glycidyl methacrylate and the like, acrylamide, methylol acrylamide, hydroxypropyl methacrylate and the like. The thermosetting acrylic resins useful in the practice of the invention can be prepared by polymerizing at least two monomers selected from those mentioned above under conditions which are well known in the art. Further, other monomers copolymerizable with the acrylic or methacrylic acid or ester can be used and include, for example, styrene. In some cases, seven or eight monomers of different types are polymerized to attain a desired level of susceptibility to thermal crosslinkage and desired physical properties. Accordingly, a diversity of combinations of the monomers are conceivable and such combinations can correspondingly provide a diversity of multi-polymers. In this sense, the thermosetting acrylic resins defined herein are intended to mean all the thermosetting resins containing acrylic and/or methacrylic main chains and functional side chains capable of thermal crosslinkage. In view of the availability, self-crosslinking, thermosetting amido-modified acrylic resins are preferably used. These resins should be soluble in organic solvent and generally have a molecular weight ranging from 5000 to 100,000, preferably 3000 to 4000.

The inorganic pigments which are useful in the present invention are, as described, black pigments which show less thermal absorptance in wavelengths over 2 microns and are oxides or double oxides of iron (Fe), manganese (Mn), copper (Cu), chromium (Cr), cobalt (Co) and nickel (Ni). These oxides and double oxides may be used singly or in combination. Specific examples of these oxides or double oxides are black oxides such as $Fe_3O_4$, $MnO_2$, $CuO$, $Co_3O_4$ and $NiO$ and double oxides indicated in Table 1 below though any other oxides or double oxides as defined above can be used as long as they are black in color. In Table 1, there is shown an emittance of each of commercially available pigments, which is obtained by forming a layer of a pigment alone in a thickness of about 2 mm on an aluminium plate under a compression pressure of about 0.5 $kg/cm^2$.

TABLE 1

| Emittance Characteristic of Black Pigments | |
|---|---|
| Black Pigment | Thermal Emittance ($\epsilon$) |
| Carbon black | 0.95 |
| $CoO.Cr_2O_3.MnO_2.Fe_2O_3$ | 0.72 |
| $CoO.NiO.Fe_2O_3.MnO$ | 0.78 |
| $CuO.Cr_2O_3.MnO$ | 0.80 |
| $(FeO)_x(Fe_2O_3)_y$ | 0.85 |
| $CuO.Cr_2O_3$ | 0.78 |
| $Fe_2O_3.MnO_2.CuO$ | 0.65 |

In conventional black coatings, carbon black is often used and such coatings exhibit high thermal emittance because of the high absorptance of carbon black in the infrared region.

The black pigments used in the present invention are relatively high in thermal emittance as seen in Table 1. This is because the size of each pigment used in this test is in the range of 0.5–1.5 micrometer. It has been found that when the particle size is suitably controlled in the range of 0.01–0.5 microns, the thermal emittance can significantly be improved as will be particularly illustrated in Example 1 appearing hereinafter.

As is seen from Table 1, the $Fe_2O_3.MnO_2.CuO$ pigment is most superior in thermal emittance, and this pigment is conveniently inexpensive.

Although combinations of these inorganic black pigments and acrylic resins can improve the selective absorptivity of film, they have the disadvantage that the adhesiveness to metal substrates is poor and other properties such as heat stability, corrosion resistance and the like are not reliably high. Accordingly, it is necessary to add a third component which shows good physical properties when shaped into a thin film as a paint composition, gives a good influence on the dispersability of pigment, and does not produce substantially any adverse effect on the selective absorptivity. This demand is met by addition of low molecular weight fluorocarbon resins. When combined with the inorganic black pigment and acrylic resin, low molecular weight fluorocarbon resins can improve physical properties of a film without giving any ill effect on the selective absorptivity. Moreover, addition of the fluorocarbon resins is effective in improving heat stability, hardness, and resistances to steam, moisture, corrosion and abrasion.

The fluorocarbon resins have generally a molecular weight of about 300 to 1000 and include tetrafluoroethylene resin, vinyl fluoride resin, vinylidene fluoride resin and the like, among which tetrafluoroethylene resin is most preferable. These fluorocarbon resins are employed in the form of particles with a size of 0.1 to 1 micrometer. Especially when particles of tetrafluoroethylene resin are used, they serve to absorb the light in wavelengths ranging from 1 to 2 micrometers. In this sense, tetrafluoroethylene resin particles are preferable.

The most preferable combination of the three components is a combination of a self-crosslinking, thermosetting amido-modified acrylic resin, a tetrafluoroethylene resin and $Fe_2O_3.MnO.CuO$.

The coating composition according to the invention can be readily prepared by mixing particles of an inorganic black pigment, an acrylic resin and a fluorocarbon resin in suitable solvent by any known means such as a ball mill. In order to obtain a thin paint film, the dispersion is preferred to have a low solid content of 5 to 20, preferably 10 to 17 wt% of the composition. Solvents useful for this purpose are those which can dissolve the acrylic resin component therein. Mixed solvents are generally used including mixtures of normal butanol, aromatic compounds such as xylene, toluene, benzene and the like, ketones such as methyl ethyl ketone, methyl isobutyl ketone, acetone and the like, etc. Upon preparation, other additives such as surfactants, fillers, dispersing agents and the like may be added as usual unless these additives produce an ill effect on the final film.

Advantageously, the coating composition is applied, for example, by spraying onto a metal substrate which is low in emittance and then baked in a usual manner. Generally, copper, aluminium, stainless steels and the like are used as the substrate.

The present invention is illustrated by way of examples. The metal substrate used in these examples was a plate of a stainless steel (YUS-190, trade name) having a size of 70 mm×150 mm×0.3 mm and defatted with alkali. This substrate had an emittance of 0.1 in wavelengths of 3–30 microns. The solar absorptance of selective absorption film was determined as follows: the spectral reflectance was measured by means of the spectrometer Model MPS-5000 (made by Shimazu Seishakusho Co., Ltd.), equipped with an integrating sphere reflector, and an absorptance was calculated from the ratio of the spectral reflectance to the AIR MASS 2 radiation or the radiation of a black body at 6000° K. The thermal emittance was measured by the use of an emission meter made by Devices & Services Co., Ltd. The examples, parts are by weight.

[EXAMPLE 1]

Particle Size of Pigment

A commercially sold $Fe_2O_3.MnO_2.CuO$ pigment was passed through sieves to classify it into six groups with respect to particle size. A self-crosslinking, thermosetting amido-modified acrylic resin (Durakuron SE-5661, available as a solution in solvent naphtha having the solid content of 50 wt%) was used as the thermosetting acrylic resin. 100 parts of this acrylic resin solution, 26 parts of the pigment of each size group, 5 parts of a fluorocarbon resin powder with a size of 0.1–1 micrometer (Lubron L-2, commercial low molecular weight tetrafluoroethylene resin) and 400 parts of a mixed solvent composed of 29 wt% of n-butanol, 21 wt% of xylene and 50 wt% of Solvesso #100 (commercial name solvent naphtha) were charged into a ball mill where they were mixed for 24 hours to give a paint.

This paint was sprayed over the stainless steel substrate in a dry thickness of 3 microns and then baked for 10 minutes at 200° C. The resulting film showed good physical properties. In Table 2, there are shown spectral characteristics in relation to the particle size of the pigment.

TABLE 2

Relation Between Selective Absorptivity and Particle Size of Pigment

| Particle Size of Pigment (microns) | Solar Absorptance ($\alpha$) | Thermal Emittance ($\epsilon$) |
| --- | --- | --- |
| 0.005–0.01 | 0.90 | 0.85 |
| 0.01–0.10 | 0.93 | 0.40 |
| 0.10–0.20 | 0.94 | 0.35 |
| 0.20–0.50 | 0.94 | 0.40 |
| 0.50–1.0 | 0.94 | 0.56 |
| 1.0–2.0 | 0.94 | 0.68 |

As is seen from the results of Table 2, the particle size is favorably in the range of 0.01–0.5 microns where the thermal emittance is below 0.50. The reason why such a fine size is effective in improving the thermal emittance is presumably due to the fact that the light scattering of the fine particles acts favorably on the selective solar absorptivity. The reason why the finest particles result in much poorer selective solar absorptivity is not clearly known but this might result from poor dispersability of the finest particles.

[EXAMPLE 2]

Ratio of Pigment/Acrylic Resin

The general procedure of Example 1 was repeated except that the pigment had a size of 0.02–0.5 microns and the amount of the pigment relative to the acrylic resin was changed.

As a result, it was found that the ratio by weight of the pigment to the acrylic resin was generally in the range of 45/100 to 65/100, preferably 50/100 to 55/100 and most preferably 55/100.

Lesser ratios than 45/100 are unfavorable for the following reason. An increase in content of the resin results in an increase in gloss of the film, by which the surface reflection increases and thus the absorptance ($\alpha$) decreases. On the other hand, the resin is higher in infrared absorptivity than the pigment, with attendant increase of the emittance ($\epsilon$). For instance, the film obtained from a composition having a pigment/acrylic ratio of 40/100 shows a solar absorptance of 0.90 and a thermal emittance of 0.65 though the mechanical strengths of the film itself are increased.

Larger ratios than 65/100 are also unfavorable since the surface gloss is almost lost. The absorptance of film increases and the emittance decreases but the physical properties of film are considerably lowered with the film surface being so soft as to be readily scratched by a nail.

Figure 2:
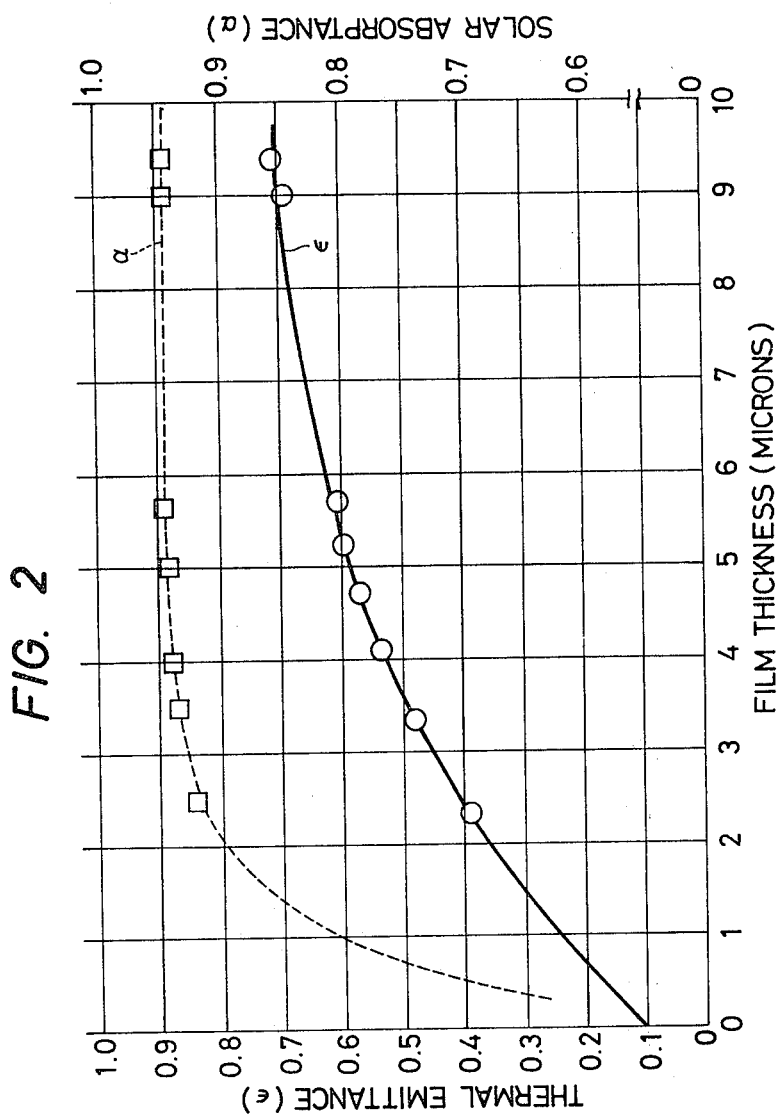
FIG. 2 is a graphical representation of the absorptance and emittance of a film obtained from a coating composition of the invention in relation to the variation in film thickness.

In order to satisfy both the selective absorptivity and the film properties, the ratio of the pigment/acrylic resin is in the range of 45/100 to 65/100 on a weight basis. In FIG. 2, there is shown a relation between the thickness of a film having the pigment/acrylic resin ratio 55/100 and the absorptance and emittance thereof.

It will be noted that the film thickness should be at least over 1.5 microns in order to obtain good physical properties for the film.

[EXAMPLE 3]

Effect of Fluorocarbon Resin

In the same manner as in Example 1 using the particle size of Example 2, selective solar absorption films of compositions were prepared to which the fluorocarbon resin was added in different amounts or 10 wt% of butylated melamine, epoxy or silicone resin based on the acrylic resin was added instead of fluorocarbon resin.

Consequently, it was found that films containing no fluorocarbon resin and 10 wt% of each of the melamine, epoxy and silicone resins based on the acrylic resin had the same absorptance of 0.94. The film having the fluorocarbon resin content of 10 wt% of the acrylic resin had an absorptance of 0.94 but its surface was semi-glossy, which was different from the rather glossy former films. The emittance increased by about 10% for the films using melamine, epoxy and silicone resins but the film containing the fluorocarbon resin showed no change with respect to the emittance.

The significant effect of addition of the fluorocarbon resin appeared when it was added in an amount of 5 wt% or more based on the acrylic resin, thus endowing good physical properties to the resulting film. In order to confirm the above, various tests were conducted as summarized in Table 3.

For example, the hardness of a film having a fluorocarbon content of 5 wt% increased from H of the fluorocarbon resin-free film to 3H when determined by the pencil hardness test. As for the heat stability, when test films were first allowed to stand at 150° C. for 200 hours and then immersed in boiling water for 24 hours followed by the peeling test using adhesive tape, it was found that the fluorocarbon resin-free film was partly peeled off in the form of spots but the fluorocarbon resin-containing film showed no change.

Similarly, cross cut films were subjected to the salt spray test for 500 hours and then to the peeling test using adhesive tape, with the result that films containing 10 wt% of each of melamine, epoxy and silicone resins based on the acrylic resin suffered blister or peeling-off but little or no change was observed with the fluorocarbon resin-containing film. From the above, it will be appreciated that the addition of the fluorocarbon resin contributes to improve the heat and corrosion resistances of the film.

As described hereinbefore, the fluorocarbon resins useful in the invention include tetrafluoroethylene resin, vinyl fluoride resin, vinylidene fluoride resin and mixtures thereof. Of these, tetrafluoroethylene resin is preferable.

The fluorocarbon resin is generally used in an amount of from 5 to 15 parts per 100 parts of the acrylic resin used, and 10 parts is optimum. Amounts exceeding 15 parts give an adverse influence on physical properties of film. For instance, when the composition is sprayed on a substrate, fine globules of the composition may be cooled owing to the evaporation of solvent whereupon a very slight quantity of moisture will be condensed on the globule surfaces, resulting in poor surface levelling due to the water repellency of the fluorocarbon resin.

In Table 3, there are shown results of various tests in which a film according to the invention was made in the same manner as in Example 1 except that the pigment had a size of 0.05–0.2 microns and, for comparative purpose, a known black coating was prepared by applying a paint composition comprising 5 wt% of carbon black having a size of 0.05 to 1 microns and the balance of a silicone binder onto a commercially available collector plate in a dry thickness of 25 microns.

TABLE 3

Physical Properties of Inventive and Comparative Films

| Test Items | Test Conditions | Film of Invention | Known Black Coating |
|---|---|---|---|
| Selective Absorptivity | | | |
| Solar absorptance ($\alpha$) | Spectrometer (0.3–2.0 microns) | 0.94 | 0.95 |
| Thermal emittance ($\epsilon$) | Emission Meter (3–30 microns) | 0.45 | 0.92 |
| Film Properties | | | |
| Primary Physical Properties | | | |
| a. Peel test by tape adhesion | Adhesive tape applied to film surface and peeled off | ○ | ○ |
| b. Cross-cut test | Adhesive tape applied to cross-cut film and peeled off | ○ | ○ |
| c. Erichsen cross-cut test | Adhesive tape applied after push-in of 5 mm | ⊙ | ○ |
| d. Impact resistance | Dupont method, 500 g × 1″ × 50 cm | ⊙ | ○ |
| e. Hardness | Pencil hardness | ○ | ○ |
| f. Bending test | 6 mm × 180° | ○ | ○ |
| g. Moisture resistance | 60° C., R.H. 90%, 10 days | ○ | ○ |
| h. Steam resistance | Autoclave, one cycle | ○ | ○ |
| Secondary Physical Properties | | | |
| i. Heat resistance | Primary tests (a), (b) after treatment under conditions of 150° C. and 1000 hours | ⊙ | ○ |
| j. Accelerated weather test | Primary tests (a), (b), (c) after measurement with the sunshine type weather meter for 2000 hours | ○ | ○ |
| k. Corrosion resistance | Primary tests (a), (b) after salt spraying for 500 hours | ○ | ○ |

○: Good
⊙: Excellent

As is clearly seen from the table, in spite of the fact the film of the invention is as thin as 3 microns in thickness, better results are obtained than those of the known black coating.

FIG. 3 shows the results of durability tests of the film of the invention under accelerated conditions, revealing that the solar absorptance of 0.94 and the thermal emittance of 0.45 are stably held.

FIG. 4 shows the collector efficiencies of flat plate collectors using the paint coating of the invention and the known black paint coating, respectively. In the vicinity of the collector efficiency of 50% for practical use, the collector using the coating of the invention increases in collector efficiency by 5% or more when compared with the known collector. If the thermal emission loss is about 20% of the total, the increase in collector efficiency of over 5% may by regarded as appropriate.

What is claimed is:

1. A coating composition for selective solar absorption which comprises a disperson, in a binder of a thermosetting acrylic resin, of particles of: an inorganic black pigment having a size ranging from 0.01 to 0.5 microns and selected from the group consisting of oxides and double oxides of Fe, Mn, Cu, Cr, Co and Ni and mixtures thereof; and particles of a low molecular weight fluorocarbon resin containing in an amount of from 5 to 15 parts by weight per 100 parts by weight of the acrylic resin, the particles of the pigment being present in an amount of from 45 to 65 parts by weight per 100 parts by weight of the acrylic resin.

2. A coating composition according to claim 1, wherein the particles of the pigments are present in an amount of from 50 to 55 parts by weight per 100 parts by weight of the acrylic resin.

3. A coating composition according to claim 1, wherein the acrylic resin is made of monomer units which have a main chain of acrylic acid, methacrylic acid or an ester thereof and functional side chains capable of crosslinkage.

4. A coating composition according to claim 1, wherein the particles of the fluorocarbon resin have a size ranging from 0.1 to 1 micrometer.

5. A coating composition according to claim 1 or 4, wherein the fluorocarbon resin is tetrafluoroethylene resin, vinyl fluoride resin or vinylidene fluoride resin.

6. A coating composition according to claim 5, wherein the fluorocarbon resin is tetrafluoroethylene resin.

7. A coating composition according to claim 1, wherein the dispersion has a solid content of 5 to 20 wt% of the composition.

8. A coating composition according to claim 7, wherein the solid content is in the range of 10 to 17 wt%.

* * * * *